United States Patent [19]

Hino et al.

[11] Patent Number: 4,686,833
[45] Date of Patent: Aug. 18, 1987

[54] METHOD OF FORMING CLATHRATE ICE

[75] Inventors: Toshiyuki Hino, Tokyo, Japan; Anthony J. Gorski, Lemont, Ill.

[73] Assignee: The United States of America as represented by the United State Department of Energy, Washington, D.C.

[21] Appl. No.: 889,308

[22] Filed: Jul. 28, 1986

Related U.S. Application Data

[63] Continuation of Ser. No. 781,541, Sep. 30, 1985, abandoned.

[51] Int. Cl.$^4$ ............................................... F25C 1/00
[52] U.S. Cl. ......................................................... 62/68
[58] Field of Search ............................. 62/66, 68, 340

[56] References Cited

U.S. PATENT DOCUMENTS

| 1,296,741 | 3/1919 | Bester | 62/68 X |
| 2,595,968 | 5/1952 | McCoy | 62/68 |
| 3,224,213 | 12/1965 | Hoyt, Jr. | 62/68 |

OTHER PUBLICATIONS

"Ice Physics", Peter J. Hobbs, 1974, pp. 500–501.
"Marks' Standard Handbook for Mechanical Engineers", Eighth Edition, pp. 12-141 and 142.

Primary Examiner—William E. Tapolcai
Attorney, Agent, or Firm—James W. Weinberger; Robert J. Fisher; Judson R. Hightower

[57] ABSTRACT

A method of forming clathrate ice in a supercooled water-based liquid contained in a vessel is disclosed. Initially, an oscillator device is located in the liquid in the vessel. The oscillator device is then oscillated ultrasonically so that small crystals are formed in the liquid. These small crystals serve as seed crystals for ice formation in the liquid and thereby prevent supercooling of the liquid. Preferably, the oscillating device is controlled by a thermostat which initiates operation of the oscillator device when the temperature of the liquid is lowered to the freezing point. Thereafter, the operation of the oscillator device is terminated when ice is sensed in the liquid by an ice sensor.

6 Claims, 1 Drawing Figure

METHOD OF FORMING CLATHRATE ICE

This is a continuation of application Ser. No. 781,541 filed Sept. 30 1985, now abandoned.

FIELD OF THE INVENTION

The present invention relates generally to the formation of ice in supercooled liquids, and more particularly to the formation of clathrate ice by moving an oscillator plate in a liquid at ultrasonic frequencies.

BACKGROUND OF THE INVENTION

Clathrate liquids form ice at temperatures above 0° C. and have been proposed as a thermal energy storage material. Clathrate ice is composed of water and a second component whose molecules are enclosed by water. Clathrates typically form clathrate ice at temperatures of 39° F. or above depending on the clathrate material. The second component may be a gas such as freon or a liquid such as tetrahydrofuran. As clathrates permit ice to be formed at higher temperatures, the use of cooling temperatures above 0° C. is possible.

One of the difficulties in utilizing a clathrate hydrate as a thermal energy storage material is the significant supercooling the clathrate experiences before it solidifies. This supercooling usually occurs 10 to 0° C. below the clathrate freezing point.

To solve this problem, it has been proposed in Japanese Patent No. 54-102297 that two combined clathrates be used. According to the disclosure of this patent, one clathrate has a higher melting point so as to keep its solid state through the usage condition. At the same time, this clathrate works as a seeding agent for crystallization of another clathrate and thereby supresses supercooling. However, there are a number of drawbacks to such a system. In the first instance, the seeding agent may be readily dissolved in the other clathrate and thereby lose the nucleation effect after a period of time. In addition, where a porous partition lies between the seeding agent and the main thermal energy storage clathrate, the expansion force of the solidification inside of the cavities may destroy the porous partition. The inherent toxicity of the seeding agent clathrate is also a disadvantage.

There has also been disclosed in the prior art the concept of using seed crystals to increase ice formation in an otherwise supercooled liquid. According to this prior art, a piece of ice in an ice maker is retained in the mold to enhance crystallization and seeding during a succeeding freezing operation. Devices of this type are disclosed in the following U.S. Pat. Nos. 4,059,970 (Loeb); 4,062,201 (Schumacher); and 4,261,102 (Elliott).

SUMMARY OF THE INVENTION

In accordance with the present invention, a method of forming ice in a supercooled water-based liquid contained in a vessel is provided. Initially, an oscillator device is located in the liquid in the vessel. the oscillator device is oscillated ultrasonically so that small crystals are formed in the liquid which serve as seed crystals for ice formation in the liquid.

Preferably, the oscillating of the oscillator device is controlled. This control is accomplished with either a thermostat or an ice sensor, or with both in the preferred embodiment. According to the preferred embodiment, the oscillating of the oscillator device is controlled by a thermostat which measures the temperature of the liquid so that the oscillating of the oscillator device is initiated when the thermostat senses the temperature of the liquid is below a predetermined threshold temperature. The oscillating of the oscillator device is also controlled to be terminated when ice is sensed in the liquid by an ice sensor. The water-based liquid is either an incongruently melting clathrate or a congruently melting clathrate.

It is an advantage of the present invention that seed crystals are formed by a mechanical means.

It is also an advantage of the present invention that the oscillator device is oscillated when the formation of seed crystals is required.

It is a further advantage of the present invention that the problems associated with the supercooling of clathrates are eliminated.

Other features and advantages of the present invention are stated in or apparent from a detailed description of a presently preferred embodiment of the invention found hereinbelow.

DESCRIPTION OF THE DRAWING

The FIGURE shows an apparatus embodying the method of the invention.

DETAILED DESCRIPTION OF THE PREFERRED EMBODIMENT

Figure 1:
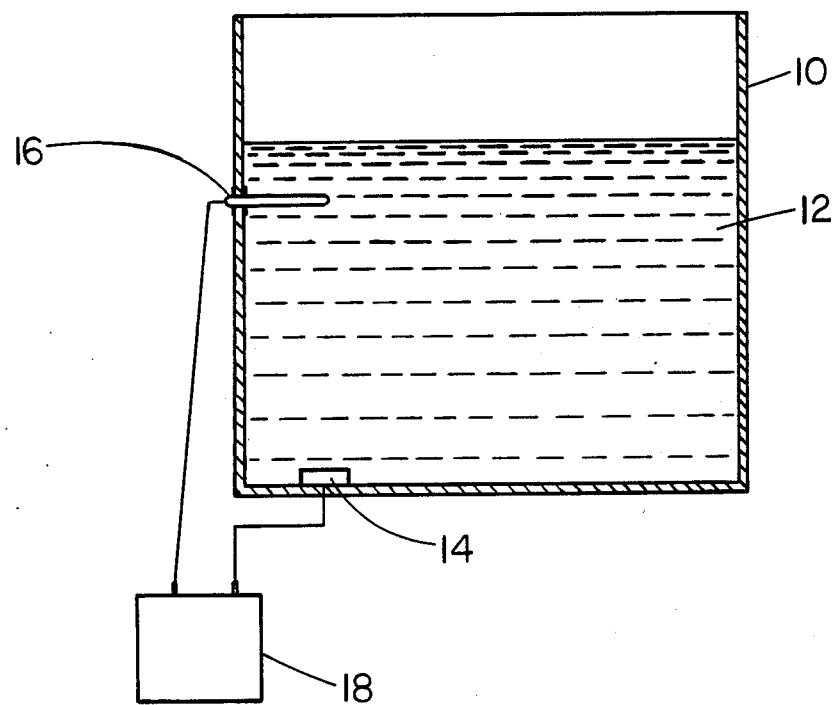

Although clathrates are readily supercooled, it has been found that even microscopic crystals of clathrate effectively work as seeding agents in supressing supercooling. In order to create microscopic crystals of that clathrate, it has also been found that a high-speed moving object in the liquid-state mixture of the hydrate former and water does readily create microscopic crystals of the clathrate when the temperature of the clathrate is at or below the freezing point.

Referring now to the single drawing, vessel 10 contains a clathrate liquid 12, such as freon or tetrahydrofuran in water. An oscillator 14 is located in the bottom of vessel 10 in direct contact with clathrate liquid 12. A thermometer and ice sensor 16, located in tank 10 in contact with clathrate liquid 12 is connected to oscillator 14 through controller 18, to regulate the operation of the oscillator in response to a predetermined temperature or the presence of ice as detected by sensor 16.

According to the present invention, an ultrasonic oscillator is used as the high speed moving object. The ultrasonic oscillator includes a plate which vibrates back and forth at the high frequency. As the oscillator plate moves forward, and backward high vacuum cavities are made behind the plate because the liquid clathrate cannot follow the plate and fill in behind the plate that fast. Thus, the saturation temperature of the clathrate formed the water around the cavities decreases sufficiently lower than the supercooling temperature of the clathrate so that microscopic clathrate crystals are formed. As the plate then moves forward into the solution, the microscopic clathrate crystals formed are scattered or flung into the liquid. The continuation of this cycle causes a sufficient number of microscopic clathrate crystals to be formed to suppress the supercooling of the clathrate as these microscopic crystals act as seeding agents.

The use of an oscillating device as described above has been tried experixentally. Both with R-11 and water that forms incongruently melting clathrate and with tetrahydrofuran and water that forms congruently melting clathrates, no appreciable supercooling was observed.

It should be appreciated that the ultrasonic oscillator device is not necessarily kept energized throughout the freezing process. Preferably, the oscillator device is controlled by a thermostat and/or a clathrate ice detector. When both a thermostat and clathrate ice detector are used, the oscillator device is turned on when the liquid temperature decreases to the freezing point as monitored by the thermostat. Thereafter, the oscillator device is turned off if part of the liquid changes to clathrate ice as detected by the clathrate ice detector.

Although the present invention has been described with respect to an exemplary embodiment thereof, it will be understood by those of ordinary skill in the art that variations and modifications can be effected within the scope and spirit of the invention.

We claim:

1. A method of forming ice in a supercooled water-based clathrate liquid contained in a vessel comprising the steps of:
   locating an oscillator device having an oscillator plate in the liquid in the vessel; and
   oscillating the oscillator plate, ultrasonically to produce cavities in the liquid behind the plate thereby forming small crystals of clathrate in the liquid surrounding the cavities, which crystals serve as seed crystals for ice formation in the liquid.

2. A method of forming ice as claimed in claim 1 and further including the step of controlling the oscillating of the oscillator device with a themostat which measures the temperature of the liquid.

3. A method of forming ice as claimed in claim 1 and further including the step of controlling the oscillating of the oscillator device with an ice sensor which senses the presence of ice in the liquid.

4. A method of forming ice as claimed in claim 3 and further including the step of additionally controlling the oscillating of the oscillator device with a thermostat which measures the temperature of the liquid such that the oscillating of the oscillating device is initiated when the thermostat senses that the temperature of the liquid is below a predetermined threshold temperature and the oscillating of the oscillating device is terminated when ice is sensed by the ice sensor.

5. A method of forming ice as claimed in claim 1 wherein the water-based liquid is an incongruently melting clathrate.

6. A method of forming ice as claimed in claim 1 wherein the water-based liquid is a congruently melting clathrate.

* * * * *